Patented Aug. 15, 1939

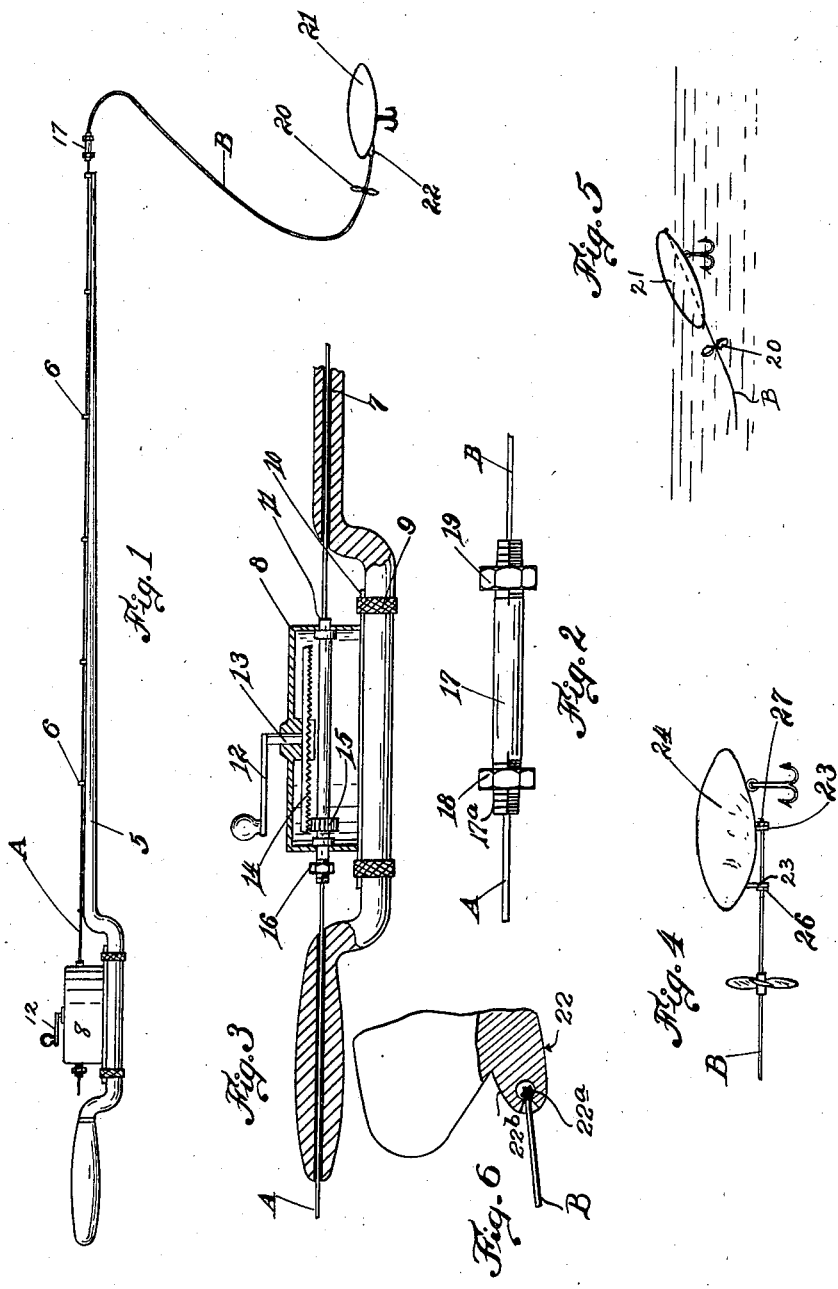

2,169,698

UNITED STATES PATENT OFFICE 2,169,698

PROPELLED AND DIRIGIBLE FISH BAIT OR LURE

Jackson Guy Lancaster, Farmville, Va.

Application August 23, 1938, Serial No. 226,349

5 Claims. (Cl. 43—43)

The object of the present invention is to provide a propelled and steerable fish bait or decoy, so arranged that movement may be imparted thereto in close simulation of natural bait, such as minnows, frogs, flies and the like, to an extent not possible with known devices of this character.

In the accompanying drawing, wherein like reference characters designate corresponding parts throughout the several figures;

Figure 1 is a side elevation of a device constructed in accordance with the invention;

Fig. 2 is a detail view of a connector, hereinafter described;

Fig. 3 is a view partly in side elevation and partly in section, showing the rear or large end of a modified form of fishing pole, hereinafter described;

Fig. 4 is a detail view illustrating a modified form of connector between the flexible shaft and the bait, Fig. 5 is a view illustrating the position assumed by the decoy or bait when the propeller is at rest and Fig. 6 is an enlarged detail view of a swivel connection, hereinafter described.

In the particular form of the invention illustrated in the accompanying drawing and which is chosen merely for purposes of illustrating the principle involved, 5 designates a fishing rod which constitutes a support for a "line", A. This line may consist of a section of stiff steel wire, like piano wire, and may be mounted in suitable eyelets 6, or it may be mounted to turn in an axial opening 7, formed in the rod.

The casing 8 of a line-rotating reel is held in place upon the rod by the sliding bands 9, which take over projections 10 of the casing 8 in a manner common in connection with the mounting of fishing reels upon fishing rods. However, the "reel" of the present invention differs from the ordinary fishing reel in that it comprises a tubular member 11, which passes through the casing 8 and has its ends projecting therebeyond. The tube 11 constitutes a hollow shaft for the reel, and rotation at relatively high speed may be imparted to this hollow shaft by manually turning the crank handle 12.

The shaft 13, upon which the crank handle is mounted, carries a crown gear 14, which meshes with a pinion 15 upon the hollow shaft 11. One end of the shaft 11 is longitudinally split in a manner similar to the structure of Fig. 2, hereinafter described, and by screwing a nut 16 upon this split end, the piano wire fishing line A may be bound to the hollow shaft, so that bodily rotation about its own axis may be imparted to said line.

A connector, comprising a short hollow shaft 17, having its ends longitudinally slotted at 17a and having compression nuts 18 and 19 threaded thereon, serves to connect the end of the line or cable A with a flexible cable or shaft section B, it being understood that the cables A and B are merely slipped into the ends of the hollow shaft, and the nuts 18 and 19 screwed upon said hollow shaft.

I prefer to use a relatively stiff line section A along the length of the pole and to use a more flexible shaft section B outwardly of the pole in order that there may be no undesirable buckling along the length of the pole while providing the necessary degree of flexibility of that portion of the line outwardly of the pole.

However, I wish to make it clear that it is within the purview of the invention to utilize material of any desired degree of stiffness or flexibility at any point in the length of the structure, and for that reason, I have, in the accompanying claims, used the term "cable" in its generic sense and as indicative of a one-piece line between reel and minnow, or a one-piece line, with the pole-carried portion of a greater degree of stiffness than the minnow-carrying portion.

In either case, the flexible shaft section B of the cable carries a small propeller wheel 20. It is especially to be noted that this propeller wheel is upon the shaft itself and not upon the minnow or decoy. The minnow 21 may be connected to the end of the flexible shaft section B by a simple swivel, indicated at 22, so that the shaft B may turn without bodily turning the minnow. This swivel action may be effected by providing the end of the flexible shaft B with a ball 22a, capable of turning with respect to the housing 22b of the swivel.

However, I prefer the arrangement shown in Fig. 4, wherein the flexible shaft B passes through suitable bearings or loops 23, upon a buoyant lure or decoy 24. This may be in the form of a minnow, a frog, a fly, or otherwise.

When the propeller is at rest, the buoyancy of the decoy will carry it to the surface of the water, and if the propeller be then rotated in such manner as to cause it to tend to move bodily toward the decoy, then the decoy will ride along the surface of the water, while if the propeller be rotated in the other direction, to exert a pull upon the decoy, the latter will be drawn beneath the surface of the water.

Since the propeller is carried by the flexible shaft and not by the minnow, it follows that there is no tendency for the turning of the shaft to tend to turn the decoy about its own longitudinal axis. Upon the contrary, the buoyancy of the decoy, combined with the capability of my mechanism to exert a thrust in either direction from a point wholly outside the body of the decoy, makes it possible for the operator to cause this bait or lure to perform all sorts of evolutions and gyrations, in a way never before possible with artificial bait of this character.

I am aware of the fact that it has heretofore been proposed to provide decoys having propellers associated therewith, through which such decoys could be propelled through the water under the influence of the rotation of a line carried by a fishing pole. However, all devices of that nature with which I am familiar have had the propellers directly carried by the decoy bodies.

By mounting the propeller directly upon the flexible shaft, I not only get away from the tendency of the propeller to rotate the minnow bodily, but I make it possible to easily and quickly substitute a frog for a minnow, a fly for a frog, etc., without disturbing the propeller at all, it being understood that the connections between the various decoys and the shaft is a readily detachable one.

This may be accomplished by having the eyelets 23 lie between a collar 26 on shaft B and a removable nut 27, upon the rear end of said shaft.

Note that in Figs. 4 and 5, the shaft B is held rigidly in parallelism with the body of the decoy 21 throughout the length of the decoy but lies below the center of gravity of the decoy during the time that the decoy is in the water. This causes the upper portion of the decoy to ride to the top and keeps the bait or decoy right side up. Of course, when the decoy is removed from the water, it swings around to the opposite side of the shaft, but this makes no difference, because at that time the decoy is not in use.

It is to be understood that the invention is not limited to the precise arrangement set forth but that it includes within its purview whatever changes fairly come within either the terms or the spirit of the appended claims.

Having described my invention, what I claim is:

1. A fish bait of the character described, comprising in combination, a flexible cable, means for rotating said cable, a bait attached to the cable and a propeller directly upon the cable and separated from the bait, said propeller lying in advance of the bait and between the bait and the rotating means of the shaft.

2. In combination, a fishing pole, a shaft extending along said pole, bearings carried by the pole in which the shaft is mounted to turn, a propelling means comprising a casing, means for binding said casing to the pole, a spindle within the casing and having an end extending to the exterior of the casing and through which said shaft is freely slidable, a clutch mechanism upon the spindle by which the spindle may be caused to grip and turn said shaft, an operating handle upon the exterior of the casing and gearing between the handle and spindle by which accelerated motion is imparted to the spindle from the handle.

3. A structure as recited in claim 2 in combination with a detachable gripping means at that end of the shaft adjacent the outer end of the fishing pole, a flexible shaft section adapted to be gripped to the first named shaft by said gripping means, a buoyant bait to which the flexible shaft section is connected and a propeller upon the flexible shaft section separated from and spaced from the bait, said propeller lying in advance of the bait and between the bait and the rotating means of the shaft.

4. In a device of the character described, the combination with a buoyant hook carrying lure, of bearings extending below said lure, a flexible shaft passing through said bearings, a propellor directly upon the flexible shaft, a fishing pole, a shaft mounted to turn upon the fishing pole and to which the first named shaft is connected and manually operable spinning means mounted upon the fishing pole and connected to the last named shaft for manually spinning said shaft.

5. The combination with a buoyant, hook-carrying lure, of a flexible shaft mounted for rotation with respect to said lure at a point below the center of gravity of the lure, a propeller directly upon the shaft and wholly separate from the lure, and means for imparting rotation to said shaft, said propeller being located at that side of the lure toward the rotating means of the shaft, whereby the lure may be removed from the shaft while leaving the propeller still mounted upon the shaft.

JACKSON GUY LANCASTER.